United States Patent

Whiting

[15] 3,648,893

[45] Mar. 14, 1972

[54] SAFETY CLOSURE FOR HIGH PRESSURE GAS TANKS

[72] Inventor: Ronald Whiting, Toledo, Ohio

[73] Assignee: Ollia B. Anderson, Toledo, Ohio a part interest

[22] Filed: Apr. 1, 1971

[21] Appl. No.: 130,517

Related U.S. Application Data

[63] Continuation of Ser. No. 741,655, July 1, 1968, abandoned.

[52] U.S. Cl. ............................ 222/3, 137/68, 137/517, 222/146 C, 222/397, 251/256
[51] Int. Cl. ................................................. F17c 13/12
[58] Field of Search ........................... 137/67–71, 460, 137/462, 517, 519, 519.5; 220/89 A, 89 B; 222/3, 146 C, 396, 397

[56] References Cited

UNITED STATES PATENTS

| | | | |
|---|---|---|---|
| 2,255,774 | 9/1941 | Huffman et al. | 137/71 |
| 2,414,113 | 1/1947 | Mapes | 222/3 X |
| 2,478,760 | 8/1949 | Holicer | 222/3 X |
| 2,479,737 | 8/1949 | Garretson et al. | 222/3 |
| 2,757,898 | 8/1956 | Cox | 137/519 X |
| 2,929,399 | 3/1960 | Magowan | 137/517 X |
| 3,147,761 | 9/1964 | Lecocq | 137/81 |

FOREIGN PATENTS OR APPLICATIONS 727,093   3/1955   Great Britain ........................ 137/517

Primary Examiner—M. Cary Nelson
Assistant Examiner—Richard Gerard
Attorney—William P. Hickey

[57] ABSTRACT

A valve body having a tank sealing portion adapted to seal off the opening of a high pressure gas tank. The tank sealing portion has a passage therethrough communicating with an external connection, and a shut off valve positioned externally of the tank sealing portion for opening and closing the passage way leading to the external connection. An extension is provided on the opposite side of the tank sealing portion from the shut off valve which projects into the pressure chamber of the tank. The extension provides a continuation of the flow passage, and further includes a flow valve for shutting off the flow out of the valve body when tripped by a flow rate above a predetermined value. The flow valve preferably includes an annular valve seat which faces upstream relative to flow out of the tank, and a ball that is held off of the seat by a spring of predetermined strength. A bypass of limited flow capacity is provided for equalizing pressure across the valve seat at a flow rate that is a fraction of that required to close the flow valve. The inlets of the flow passage through the flow valve, and the bypass preferably open into the internal chamber of the tank a sufficient distance from the tank sealing portion of the body to prevent condensate from entering the flow passages when the tank is inverted.

4 Claims, 3 Drawing Figures

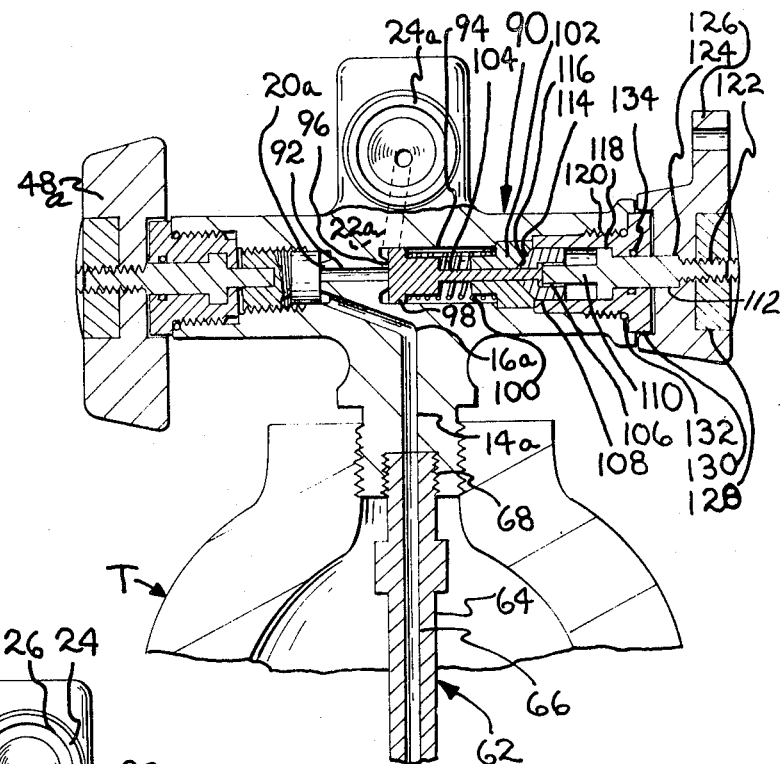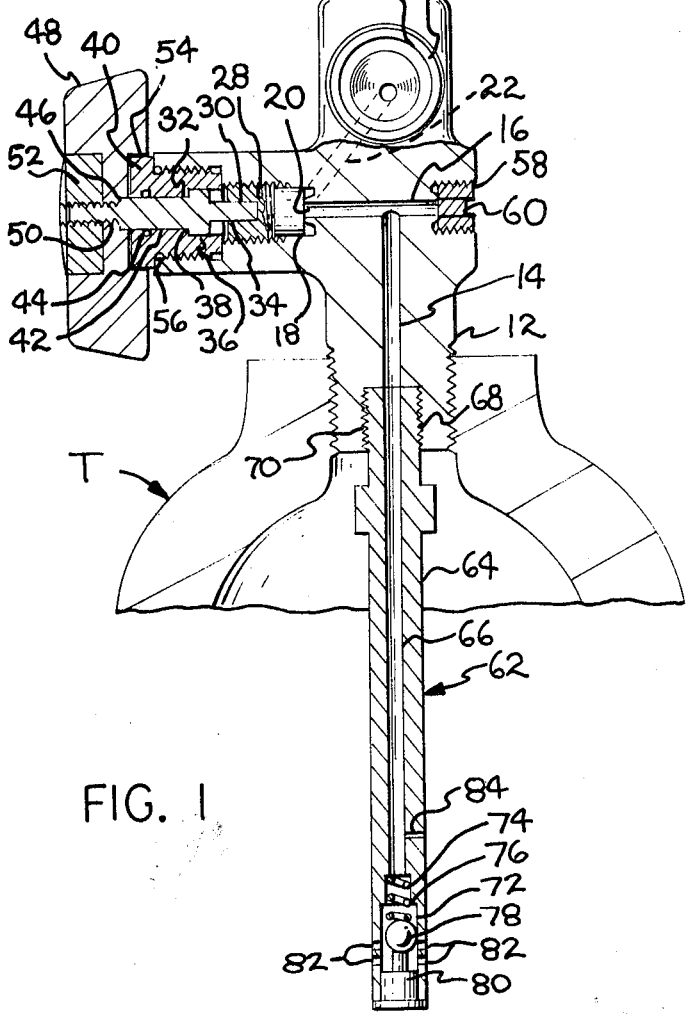

SAFETY CLOSURE FOR HIGH PRESSURE GAS TANKS

This is a continuation of application, Ser. No. 741,655, filed July 1, 1968, and since abandoned.

BACKGROUND OF THE INVENTION

Compressed gases contain energy that is generally proportional to the pressure and volume of the compressed gas. Compressed gases are capable of performing tremendous amounts of work, and their sudden release is a hazard that has long required government supervision of boilers, compressed air systems, and the high pressure tanks or bottles in which high pressure gases are shipped. The equipment that is used to compress the gases to a thousand p.s.i. or more is so expensive that gases are usually compressed to this high pressure at a central location and transported to the user in small portable tanks or bottles. These tanks or bottles can be as destructive as a bomb should they rupture, and the Interstate Commerce Commission of the United States Government has established regulations concerning the transporting and storage of high pressure tanks or bottles. Other governmental agencies have regulations concerning stationary installations handling high pressure gases, but the I. C. C. regulations governing the smaller transportable tanks are more stringent than those governing the stationary installations.

Removable closures for high pressure tanks become progressively more expensive to manufacture as the pressure which they must withstand increases, and therefore, high pressure storage tanks for compressed gases have as few openings therein as possible, and usually have only one. Because removable closures are so expensive to make, the opening or openings provided are kept as small as possible, and are usually threaded.

The closure members which have been produced heretofore comprise a solid valve body having an integral projection at one end which fits into and seals off the tank opening on which it is installed. The valve body contains a flow passage leading to an outlet connection adapted to be coupled to a distribution system. The valve body further includes a shut off valve positioned externally of the tank sealing portion, and which is adapted to close off the passage way, and thereby make it possible to transport the tank and couple it to the distribution system. The valve bodies are made exceedingly rugged but nevertheless are weaker than the tank structure itself, and if the tanks are dropped or the valve bodies otherwise hit, the valve bodies are cracked off externally of the tank on which they are mounted. The violent release of gas which occurs when the valve bodies are broken produces a tremendous thrust capable of blowing the tank through a solid brick wall. The tremendous hazard which these bottles create has long been recognized by the Interstate Commerce Commission, and the commission has required that high pressure oxygen, hydrogen, and chlorine cylinders be shipped with a protective device (usually a valve cap) to guard against the hazard which occurs when a valve is knocked off of the tank. Since the Interstate Commerce Commission regulation, caps have done much to make the transportation of high pressured gases relatively safe, but the regulation does not provide protection during use when the cap must be removed to gain access to the connection for the distribution system.

There are a number of types of high pressure tanks or bottles or cylinders that are not equipped with protective caps. One type of bottle that is not currently equipped with a protective cap is the air bottles used by scuba divers, commonly called scuba tanks. Another type of tank not equipped with caps are the small tanks used in carbonated beverage venting devices and the like. These tanks contain over 1,000 p.s.i. of pressure, usually more than 2,000 p.s.i., and sometimes as much as 3,000 p.s.i., and are capable of tremendous damage to personnel and equipment when their shut off valve is suddenly opened or damaged.

The storage cylinders for high pressure gases must also be protected against over pressure, either as a result of over filling, or as a result of pressure generated in the cylinder due to the absorption of heat as occurs when the cylinders are enveloped by fire. To protect against this possibility, most valve bodies of the type above described include a burst plug or other safety device positioned outwardly of the tank sealing portion. These safety devices are capable of releasing high pressure gases at a rate corresponding to that which occurs when the valve is knocked off of the pressure cylinder, so that even though the tank is prevented from bursting, the rupture creates a hazard generally equaling that of a ruptured shut off valve.

An object of the present invention is the provision of a new and improved closure member, or shut off valve, for compressed gas cylinders, tanks, bottles, etc., which eliminates the hazard which presently occurs when the tank shut off valve is inadvertently opened or knocked off of the tank on which it is installed.

Another object of the present invention is the provision of a new and improved shut off valve of the above described type which eliminates the hazard which occurs when the rupture plug or other safety device discharges the contents of the tank.

A further object of the present invention is the provision of a new and improved shut off valve for scuba tanks which eliminates the hazard which occurs when a scuba tank is dropped or hit.

Further objects and advantages of the invention will become apparent to those skilled in the art to which the invention relates from the following description of several preferred embodiments described with reference to the accompanying drawings forming a part of this specification, as well as the following detailed description.

SUMMARY OF THE INVENTION

According to the invention, there is provided a tank closure having a tank sealing portion containing a flow passage therethrough for communicating the contents of the tank with an external conduit connection, and a shut off valve between the connection and the tank sealing portion for closing off the flow passage. The structure further includes an extension or projection on the opposite side of the tank sealing portion from the shut off valve, for projecting into the internal chamber of the tank to which the valve is to be connected. The projection contains a flow valve for preventing flow out through the flow passage when tripped by a flow rate of a predetermined value. The structure further includes a bypass around the flow valve, which bypass has a flow capacity only a fraction of that of the flow valve. The bypass and flow valve preferably open into the external surface of the extension at a point sufficiently remote from the tank sealing portion to prevent condensate from entering the flow passage when the tank is inverted. The flow valve preferably includes a seat which faces against the flow out of the tank, and a spherical ball biased off of the seat by a spring which assures that the valve will operate in any position.

BRIEF DESCRIPTION OF THE DRAWINGS

FIG. 1 is a longitudinal sectional view of a closure member, embodying principals of the present invention, for the opening of a high pressure tank;

FIG. 2 is a longitudinal sectional view similar to FIG. 1 but showing another embodiment of tank closure member having a hand operated back pressure valve which closes off at pressures below a predetermined value.

DESCRIPTION OF THE PREFERRED EMBODIMENTS

Figure 3:
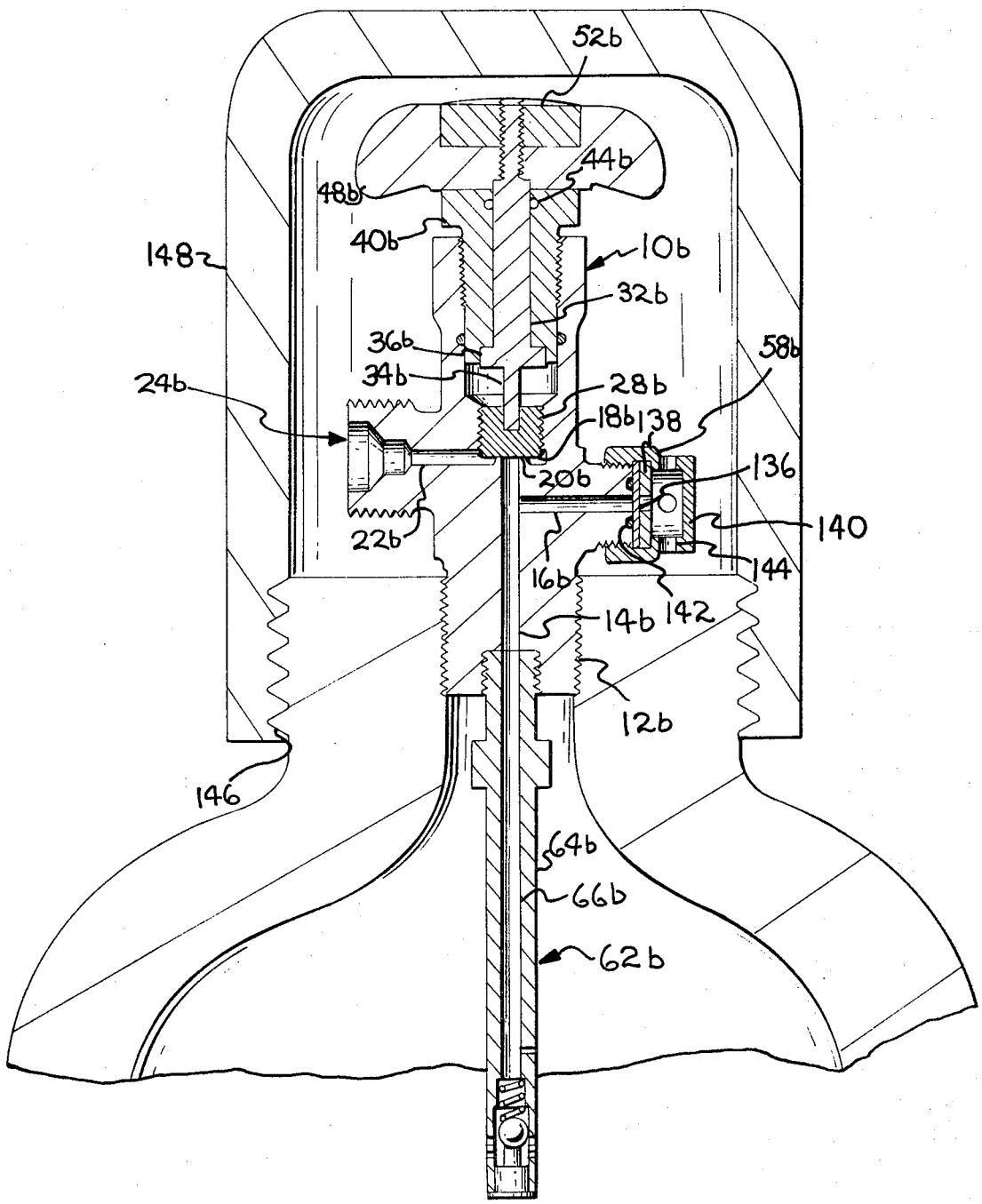
FIG. 3 is a longitudinal sectional view of a closure valve for an oxygen bottle and the like, and which embodies principals of the present invention.

FIG. 1 of the drawing shows a tank closure 10 for a scuba tank, and the like. The tank closure body 10 generally comprises a tank sealing projection 12 adapted to fit into and close off the opening of the tank on which the valve is to be installed, and contains an axially extending passageway 14 therein for communication with the internal chamber of the tank. In the present instance, the tank closure 10 is to be used with a tank having a threaded opening therein, and the tank sealing projection 12 is provided with pipe thread for threaded sealing engagement with those of the opening of the tank. The axially extending passage 14 opens into a transverse passage 16 which extends through the tank closure body and which is counterbored as at 18 to provide a valve seat 20. A lateral passage 22 connects the inner end of the counterbore 18 with a discharge connection 24 having an O-ring 26 therein for sealing engagement with a distribution or use system when secured to the connection 24. A valve closure member 28 is threaded into the inner portion of the counterbore 18 for sealing engagement with the valve seat 20, and the outer end of the closure member 28 is provided with a diametrically extending slot 30 by which the closure member is threaded towards and away from the seat 20.

The valve closure member 28 is rotated by a valve stem 32 having a tang end portion 34 which fits into the slot 30 and a collar 36 which is received in an internal counterbore 38 in an annular gland nut 40. The stem 32 extends outwardly through the central opening 42 of the gland nut, and the O-ring 44 is positioned in a recess in the gland nut for sealing engagement with the valve stem 32. The outer end of the valve stem 32 is necked down to provide a shoulder 46, and a hand knob 48 is positioned over the outer necked down portion 50 and is held against the shoulder 46 by a nut 52 having threaded engagement with the reduced diameter portion 50. The gland nut 40 has an outer flange 54 for engagement with the outer side surfaces of the tank closure body 10. An O-ring 56 is seated at the juncture of the flange 54 and the cylindrical portion of the gland nut for sealing engagement with the side walls of a counterbore in the outer end of the transverse passage 18. The external surfaces of the inner end of the gland nut 40 have threaded engagement with the side walls of the outer enlarged portion of the counterbore 18.

The structure further includes a safety device 58 which, in the present instance, is a burst plug that is threaded into the outer end of the transverse passage 16. The burst plug 58 has an axially extending opening 60 therethrough which is filled with a soft metal that is designed to blow out at pressures above a predetermined level. In the valve shown in FIG. 1, the metal is blown out of the burst plug 58 at 2,500 p.s.i. when at a temperature of 100° F. At temperatures above 100° F. the soft metal will be blown out at pressures below 2,500 lbs. per square inch to provide protection for the tank on which it is installed when the tank is heated, as by fire, etc.

As previously explained, the tank sealing projection 12 is threaded into the opening of a tank T in which the valve is to be installed. The opening of the tank is reinforced so that it offers firm support for the tank closure body 10 when it is installed therein. The tank closure body 10 is usually machined from a forging, usually brass, and when a tank closure body 10 that is installed on a tank is struck with a lateral blow, the closure body 10 breaks off at the root of the threads on the tank sealing projection 12 just outwardly of the tank. Rupture of the tank closure member 10 therefore always occurs between the tank sealing projection 12 and the shut off valve 28. The sudden rush of gas out of the broken body produces a violent thrust which is capable of great damage.

The structure shown in FIG. 1 is provided with flow valve means 62 for preventing violent exiting of gas upon the rupture of the tank closure body 10. The flow valve means 62 shown, comprises a generally tubular extension or dip tube 64 on the tank sealing projection 12. The tubular extension 64 has an external diameter that is less than that of the tank sealing projection 12, and includes an axially extending passageway 66, one end of which is sealed with respect to the passageway 14 and the other end of which communicates with the external surfaces of the extension 64 at a location remote from the tank sealing portion 12. The tubular extension 64, shown in the drawing, is removably secured to the tank closure body 10 by means of pipe threads 68 which are threaded into a threaded counterbore 70 in the end of the tank sealing projection 12. The opposite end of the axially extending opening 66 is provided with a stepped counterbore 72 having a coil spring 74 seated in the inner end of the counterbore with its outer end, in its uncompressed condition, extending outwardly of the valve seat 76 formed by the outer stepped portion of the counterbore. A ball valve 78 made of a noncorroding material is positioned against the spring 74 and is held thereagainst by a retaining plug 80 which is positioned in the end of the opening 66 and is staked in place. A plurality of lateral drillings 82 extend through the side walls of the tubular extension 64 inwardly of the ball 78 to communicate the passage 66 with the external surfaces of the extension 64. The structure is completed by a tiny bypass 84 drilled through the side walls of the extension 64 outwardly of the valve seat 76.

Upon rupture of the tank closure body 10 shown inn FIG. 1, the rapid exiting of gas past the ball 78 produces a differential pressure across the ball 78 which overcomes the force of spring 74 and forces the ball against the valve seat 76. The ball is seated quickly, and insufficient gas flows pass the ball to produce any great thrust upon the bottle or tank. Thereafter, a slow seepage of gas continues through the bypass 84, but the bypass 84 has such a small flow capacity that no great thrust is produced. The flow valve means 62 provides still other functions in that it provides protection against a rupture in the distribution system, or a rupture of the safety device 58. A rupture of the distribution system causes the valve 78 to close off the passage 66 to all but a small flow through the bypass 84. The shut off valve 28 may then be closed, after which the flow through the bypass 84 equalizes pressure across the ball 78 allowing the spring 74 to move the valve 78 off of its seat to open the passage 66 for its normal use. A rupture of the safety device 58 likewise causes the valve 78 to close after which the plug 58 can be unthreaded and a new one installed. Thereafter the bypass 84 will allow the pressure to equalize across the ball valve 78 and the spring 74 will move it from its seat to place it in condition again for normal operation.

The tank closure body 10 shown in FIG. 2 of the drawings is generally similar to that shown in FIG. 1, but differs principally therefrom in that a back pressure valve 90 is positioned between the valve seat 20a and the outlet connection 24a. Those portions of the embodiment shown in FIG. 2 which are similar to corresponding portions of FIG. 1 are designated by a like reference numeral characterized further in that a subscript "a" is affixed thereto.

The valve seat 20a is formed by the counterbore 18a of a transverse passage 92 that is located above, and at right angles to, the transverse passage 16a. The opposite end of the transverse passage 92 is counterbored as at 94 to provide a valve seat 96 against which a valve closure member 98 is biased by a coil spring 100. The lateral passage 22a connects the counterbored portion 94 beneath the valve 98 with the outlet connection 24a. The coil spring 100 is held in position by an annular retainer 102 through which a stem portion 104 of the closure member 98 extends. The outer end of the stem portion 104 is positioned in an internal counterbore 106 of an annular cam 108, and the outer end of the stem 104 is flared over in the counterbore 106 to prevent end wise removal of the annular cam 108. The outer end of the annular cam 108 is provided with a diametrically extending slot for receiving the tang end 110 of a valve actuating stem 112. Upon rotation of the stem 112, cam member 108 is rotated to cause its inner wedged shaped end 114 to slide outwardly over the outer cam surface 116 of the annular retainer 102. This pulls the stem 104 outwardly against the force exerted by the coil spring 100 to move the valve closure 98 from its seat 96.

The stem 112 is provided with a shoulder 118 seated against the surface of an inner internal counterbore in the gland nut 120 to prevent end wise removal of the stem 112. The stem 112 is provided with a reduced diameter threaded portion 122 forming a shoulder 124 against which an actuating lever 126 is positioned and held in place by a hold down nut 128. The gland nut 120 has a flange 130 seated against the outer surface of the body 10a with an O-ring seal 132 positioned between the external surface of the gland nut, the flange 130 and the side walls of a counterbore in the outer end of the stepped opening 94. Another O-ring seal 134 is provided between the stem 112 and the gland nut, and the inner end of the gland nut holds the annular retainer 102 in position.

The spring 100 is designed to exert sufficient force on the valve closure member 98 to create a back pressure of 300 lbs. per square inch in the pressure tank on which the structure is installed. The structure shown in FIG. 2 has particular advantages when used for the closure structure of a scuba tank, and when the pressure in the tank on which it is installed leaks down to 300 lbs. per square inch, the valve 98 closes to stop air flow to the diver. The diver then turns the operating lever 126 to cause the annular cam 108 to ride outwardly over the camming surface of the retainer 102 to lift the valve closure member 98 off of its seat 96. This then makes available the remaining 300 lbs. of air pressure in the tank, for the user who now being properly warned, completes the dive with the remaining air.

The embodiment shown in FIG. 3 is somewhat similar to the embodiments shown in FIG. 1 and 2, in that it provides shut off means for a high pressure bottle, but is designed so that the shut off valve can be enclosed in a cap. The closure member 10b of FIG. 3 is specifically designed to close off the opening in the end of a four foot oxygen bottle and the like, and those portions which are similar to the embodiments shown in FIGS. 1 and 2 are designated by a like reference numeral characterized further in that a subscript "b" is affixed thereto.

In the embodiment shown in FIG. 3, the safety device 58b comprises a rupture disk 136 that is held over the end of the transverse passage 16b by an annular holddown washer 138, and threaded holddown nut 140. An O-ring 142 is positioned in a groove beneath the rupture disk to provide a seal between the rupture disk and the tank closure body 10b. The rupture disk is set to burst at a pressure of approximately 2,500 lbs. per square inch, and the gas exiting therefrom is vented through lateral openings 144 in the hold down nut 140. The tanks adapted for use with the tank closure structure 10b have an externally threaded pad 146 onto which a threaded cap 148 is screwed. The threaded cap 148 when in position, protects the closure member against lateral blows but must be removed when the distribution system, or use system, is connected to the outlet connection 24b. As explained above, therefore, the cap 148 protects the shut off valve from breakage while the flow valve 62b provides protection even if breakage occurs.

It will also be seen that the tank closure of the present invention provides protection against the hazards created by a rupture of the distribution system connected to the closure member, or a rupture of the safety device which guards against over pressure in the tank. One possible source of over pressure occurs when the tank on which the closure member is installed is enveloped by fire. The bypass 84 is sized to vent the tank on which the closure member is installed at a rate that is greater than the increase in pressure which can be created by heat transfer from a fire through the side walls of the tank. The rate at which the gas must be evacuated from the tank to offset the rate of heat inflow to the tank is relatively small with the tank closure of the present invention by reason of the cooling effect which occurs due to the expansion of the gas through the bypass 84. Inasmuch as the bypass is located in a sizable amount of metal located within the tank, a large amount of heat is absorbed by the gases before leaving. To aid in the absorption of heat, the extension 64 is preferably made of brass or other metal having a high coefficient of heat transfer. The bypass 84, and the flow valve 78 are located sufficiently remotely from the tank sealing projection 12 that they are always located in clean uncontaminated gas even through the bottle is inverted, and condensate flows over the outer end of the tubular extension 64. The throttling of exiting gas from oxygen bottles during a fire is particularly important in that it reduces the feed of oxygen to the fire surrounding the bottle. To my knowledge, no prior art safety device performs this function.

While the invention has been described in considerable detail, I do not wish to be limited to the particular embodiments shown and described, and it is my intention to cover hereby all novel adaptations, modifications, and arrangements thereof which come within the practice of those skilled in the art to which the invention relates.

I claim:

1. A pressure relief assembly for closing an opening in a high pressure tank comprising: a body having a tank sealing portion of predetermined cross section for closing said opening of the tank, a flow passage extending through said tank sealing portion of said body, a shut off valve positioned externally of said tank sealing portion and communicating with said flow passage, pressure relief means communicating with said flow passage and constructed and arranged to open at a predetermined pressure, said body also having a heat exchange portion projecting inwardly from said tank sealing portion to effect heat exchange with gases confined in the gas storage area of the high pressure tank, a pressure relief passage extending through said heat exchange portion to said flow passage, flow valve means normally communicating said flow passage with external surfaces exposed to the inner chamber of said tank and constructed and arranged to close off flow from said tank to said flow passage in response to a surge in exiting flow through said flow valve means, and throttling means positioned in said heat exchange portion remotely from said tank sealing portion to throttle all flow into said heat exchange portion when said flow valve means is closed, said throttling means bypassing said flow valve means and having a flow capacity which is only a fraction of that of said flow valve means, and whereby closure of said flow valve means causes substantially all flow out of said tank to be throttled, cooled and passed through said heat exchange portion to cool the contents of the tank in which it is installed.

2. The pressure relief assembly of claim 1 wherein said heat exchange portion is a tubular member resistant to corrosion by water, and said throttling means is an orifice through the sidewalls of the tubular member.

3. The pressure relief assembly of claim 2 wherein said flow valve means is located in the end of said tubular member, remote from said body.

4. A closure assembly for the opening of a high pressure gas tank comprising: a valve body having a tank sealing portion of predetermined cross section for sealing off said opening of the tank, a flow passage extending through said tank sealing portion of said valve body, a shut off valve positioned externally of said tank sealing portion and communicating with said flow passage, pressure relief means positioned externally of said tank sealing portion and communicating with said flow passage, an inner valve body portion positioned to the opposite side of said tank sealing portion from said shut off valve and extending to a location that is remotely located from the sidewalls of the tank, said inner valve body portion having a cross section no greater than said tank sealing portion and having an internal flow passage forming an extension of said flow passage in said tank sealing portion, flow valve means for closing off said flow passage in response to a surge in exiting flow through said flow passage, said flow valve means being mounted on the remote end of said inner valve body portion and controlling flow through said inner flow passage, and a throttling orifice bypassing said flow valve means and communicating with external surfaces of said inner valve body portion that are remotely located from said tank sealing portion, said throttling orifice having a flow capacity sized to vent the tank on which the closure assembly is to be installed.

* * * * *

UNITED STATES PATENT OFFICE
CERTIFICATE OF CORRECTION

Patent No. 3,648,893          Dated   March 14, 1972

Inventor(s)   Ronald Whiting

It is certified that error appears in the above-identified patent and that said Letters Patent are hereby corrected as shown below:

On the cover sheet [73] Assignee: "Ollia B. Anderson, Toledo, Ohio a part interest" should read -- William P. Hickey, Toledo, Ohio --.

Signed and sealed this 21st day of May 1974.

(SEAL)
Attest:

EDWARD M. FLETCHER, JR.　　　　　　　　　C. MARSHALL DANN
Attesting Officer　　　　　　　　　　　　Commissioner of Patents